(12) United States Patent
Tsuda et al.

(10) Patent No.: US 10,081,929 B2
(45) Date of Patent: Sep. 25, 2018

(54) SHOVEL

(71) Applicant: SUMITOMO(S.H.I.) CONSTRUCTION MACHINERY CO., LTD., Tokyo (JP)

(72) Inventors: Kazuya Tsuda, Chiba (JP); Akihiro Yamamoto, Chiba (JP)

(73) Assignee: SUMITOMO (S.H.I) CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 15/092,762

(22) Filed: Apr. 7, 2016

(65) Prior Publication Data

US 2016/0222629 A1    Aug. 4, 2016

Related U.S. Application Data

(63) Continuation of application No. PCT/JP2014/076825, filed on Oct. 7, 2014.

(30) Foreign Application Priority Data

Oct. 8, 2013  (JP) ................................ 2013-211167

(51) Int. Cl.
  *E02F 9/08* (2006.01)
  *B60K 15/063* (2006.01)
  (Continued)

(52) U.S. Cl.
  CPC ............ *E02F 9/0833* (2013.01); *B60K 13/04* (2013.01); *B60K 15/063* (2013.01); *E02F 3/32* (2013.01);
  (Continued)

(58) Field of Classification Search
  CPC ......... E02F 9/0833; E02F 3/32; E02F 9/0891; E02F 9/0883; B60K 13/04; B60K 15/063;
  (Continued)

(56) References Cited

U.S. PATENT DOCUMENTS 8,177,387 B2 * 5/2012 Noda ........................ E02F 9/00
                                                              224/401
8,661,793 B2 * 3/2014 Yamashita ............. B60K 13/04
                                                              60/286
(Continued)

FOREIGN PATENT DOCUMENTS

JP    2002-256593    9/2002
JP    2005-307968    11/2005
(Continued)

OTHER PUBLICATIONS

International Search Report dated Dec. 22, 2014.

*Primary Examiner* — Jacob B Meyer
(74) *Attorney, Agent, or Firm* — IPUSA, PLLC

(57) ABSTRACT

A shovel includes a boom; a rotating upper body that supports the boom; an engine mounted on the rotating upper body; a cab mounted on the rotating upper body; a rotating frame mounted on the rotating upper body; a fuel tank mounted on the rotating frame; a liquid reducer tank, placed near the fuel tank on the rotating frame, that stores liquid reducer; and a stair system, mounted on the rotating frame at an opposite side of the cab with respect to the boom, that includes a plurality of tread boards and a plurality of riser boards, wherein the liquid reducer tank is placed in a space formed under the stair system, and wherein one of the riser boards that faces a liquid inlet of the liquid reducer tank includes a door capable of being opened and closed.

18 Claims, 8 Drawing Sheets

(51) Int. Cl.
*F01N 3/20* (2006.01)
*B60K 13/04* (2006.01)
*E02F 3/32* (2006.01)

(52) U.S. Cl.
CPC .......... *E02F 9/0883* (2013.01); *E02F 9/0891* (2013.01); *F01N 3/2066* (2013.01); *B60Y 2200/412* (2013.01); *F01N 2340/04* (2013.01); *F01N 2590/08* (2013.01); *F01N 2610/02* (2013.01); *F01N 2610/1406* (2013.01); *F01N 2610/1433* (2013.01); *Y02A 50/2325* (2018.01); *Y02T 10/24* (2013.01)

(58) Field of Classification Search
CPC ........... F01N 3/2066; F01N 2610/1433; F01N 2340/04; F01N 2590/08; F01N 2610/02; F01N 2610/1406; Y02T 10/24; B60Y 2200/412
See application file for complete search history.

(56) References Cited

U.S. PATENT DOCUMENTS

| | | | | |
|---|---|---|---|---|
| 8,708,087 B2* | 4/2014 | Kashu | ................... | B60K 13/04 180/291 |
| 8,973,692 B1* | 3/2015 | Okuda | ................ | B60L 11/1877 180/68.5 |
| 9,027,688 B2* | 5/2015 | Okuda | ................ | B60K 13/04 180/89.2 |
| 9,027,697 B2* | 5/2015 | Kobayashi | ............ | E02F 9/0875 180/296 |
| 9,061,582 B2* | 6/2015 | Sawada | ................. | B60K 13/04 |
| 9,186,984 B2* | 11/2015 | Balzer | ................. | B60K 15/0406 |
| 9,234,328 B2* | 1/2016 | Kanamaru | ................ | E02F 3/32 |
| 9,255,382 B2* | 2/2016 | Noda | ........................ | E02F 9/16 |
| 9,366,007 B2* | 6/2016 | Azuma | ................. | E02F 9/0833 |
| 9,366,009 B2* | 6/2016 | Shintani | ................. | B60K 13/04 |
| 9,453,327 B2* | 9/2016 | Okamoto | ............... | E02F 9/0883 |
| 2012/0067660 A1* | 3/2012 | Kashu | .................... | B60K 13/04 180/296 |
| 2013/0071295 A1* | 3/2013 | Terakawa | .............. | E02F 9/0858 422/168 |
| 2013/0292386 A1* | 11/2013 | Klauer | .................. | B60K 13/04 220/553 |
| 2014/0000975 A1* | 1/2014 | Ueda | ..................... | E02F 9/0858 180/291 |
| 2014/0023473 A1 | 1/2014 | Kobayashi et al. | | |
| 2015/0016932 A1* | 1/2015 | Azuma | ................. | E02F 9/0833 414/687 |
| 2016/0288845 A1* | 10/2016 | Honda | .................. | E02F 3/3414 |

FOREIGN PATENT DOCUMENTS

| | | |
|---|---|---|
| JP | 2006-321294 | 11/2006 |
| JP | 2008-240676 | 10/2008 |
| JP | 2008-291678 | 12/2008 |
| JP | 2011-012661 | 1/2011 |
| JP | 2011-064132 | 3/2011 |
| JP | 2011-241734 | 12/2011 |
| JP | 2012-062693 | 3/2012 |
| JP | 2012-154150 | 8/2012 |
| JP | 2013-002082 | 1/2013 |
| JP | 2014-077301 | 5/2014 |
| WO | 02/070827 | 9/2002 |
| WO | 2012/172903 | 12/2012 |
| WO | 2013/137169 | 9/2013 |

* cited by examiner

SHOVEL

CROSS-REFERENCE TO RELATED APPLICATION

This application is a continuation application filed under 35 U.S.C. 111(a) claiming the benefit under 35 U.S.C. 120 and 365(c) of PCT International Application No. PCT/JP2014/076825 filed on Oct. 7, 2014, which is based upon and claims the benefit of priority of Japanese Patent Application No. 2013-211167 filed on Oct. 8, 2013, the entire contents of which are hereby incorporated by reference.

BACKGROUND OF THE INVENTION

1. Field of the Invention

The present invention relates to a shovel including a stair system.

2. Description of the Related Art

In a construction machine, there is a case that an operator gets on a housing cover of a rotating upper body for maintenance or the like. Thus, a step structure for moving up and down is provided at the rotating upper body for the operator to get on the housing cover. This step structure for moving up and down is provided near a fuel tank, for example.

However, in the step structure for moving up and down as described above, the placement of a liquid reducer tank that stores liquid reducer is not considered. Thus, it is not considered to apply the structure to a shovel on which the liquid reducer tank is mounted.

SUMMARY OF THE INVENTION

Thus, it is desirable to provide a shovel including a stair system in which a liquid reducer tank is capable of being appropriately placed.

According to an embodiment, there is provided a shovel including a liquid reducer tank that stores liquid reducer and a stair system that includes a plurality of tread boards and a plurality of riser boards, wherein the liquid reducer tank is placed in a space formed under the stair system, and wherein one of the riser boards that faces a liquid inlet of the liquid reducer tank includes a door capable of being opened and closed.

According to the above described structure, a shovel including a stair system in which a liquid reducer tank is capable of being appropriately placed is provided.

DETAILED DESCRIPTION OF THE PREFERRED EMBODIMENTS

Figure 1:
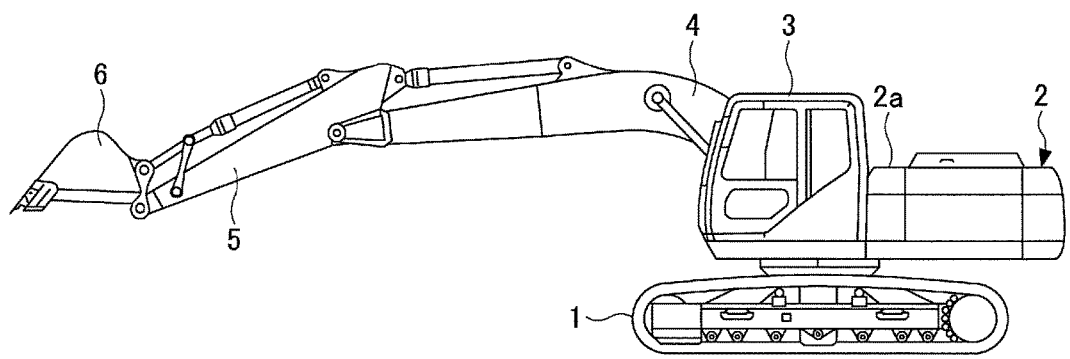
FIG. 1 is a side view illustrating a hydraulic shovel as an example of a construction machine.

Next, non-limiting example embodiments of the present invention will be described below with reference to drawings.

In the description of the attached all drawings, the same members of components are given the same or corresponding reference numerals, and overlapping explanations are not repeated. Further, the drawings, unless specifically designated, are not purposed to indicate a relative ratio between members or components. Thus, specific sizes may be determined by those skilled in the art based on the following non-limiting embodiments.

Further, the embodiments described below are not intended to limit the invention and are simply examples, thus, all features and combinations thereof, as described in the embodiments, are not necessarily essential to the invention.

FIG. 1 illustrates a construction machine of an embodiment. In this embodiment, a hydraulic shovel is exemplified as an example of the construction machine. However, the present invention is adaptable to another construction machine as long as it includes a stair system.

In the construction machine, a rotating upper body 2 is rotatably installed on a traveling lower body 1, and a cab 3 is provided at a forward portion of the rotating upper body 2. Further, a boom 4 is pivotally fitted at a forward center portion of the rotating upper body 2 as being capable of elevating, and an arm 5 is connected to a front end portion of the boom 4 as being rotatable in upper and lower directions. Further, a bucket 6 is attached to a front end portion of the arm 5 as being rotatable in upper and lower directions.

Figure 2:
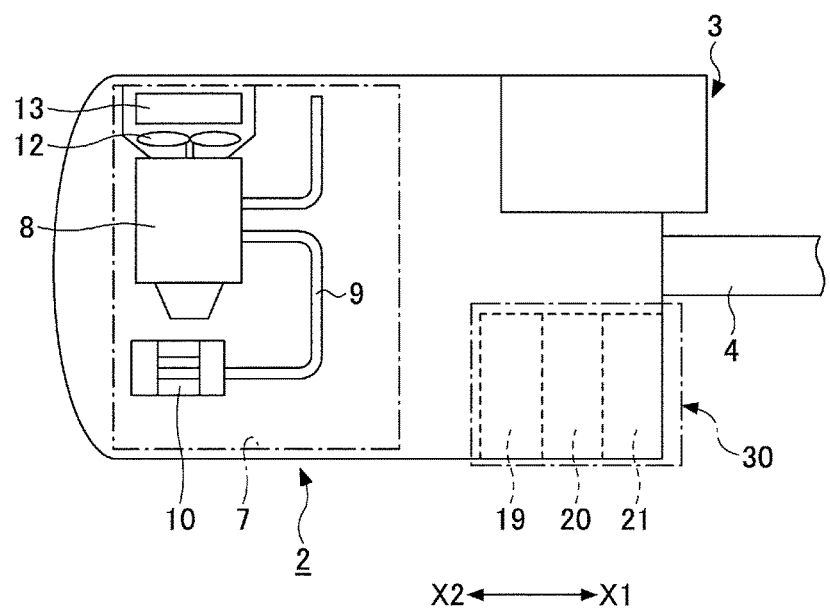
FIG. 2 is a plan view schematically illustrating a rotating upper body of the hydraulic shovel of FIG. 1.

FIG. 2 is a plan view schematically illustrating the rotating upper body 2.

As illustrated in FIG. 2, an engine room 7 is formed in the rotating upper body 2, and a diesel engine 8 is provided in the engine room 7. Further, a cooling fan 12 is provided at a front side of the diesel engine 8, and a heat exchanger unit 13 including a radiator or the like is provided at a front side of the cooling fan 12.

Further, an exhaust pipe 9 is connected to the diesel engine 8, and an exhaust gas processing device 10 that cleans (removes) nitrogen oxides (hereinafter, referred to as "NOx") in the engine exhaust gas is provided downstream in the exhaust pipe 9 in order to correspond to stringent regulations of exhaust gas.

As the exhaust gas processing device 10, a urea selective reduction NOx processing device is adopted in which urea water is used as liquid reducer. In this exhaust gas processing device 10, liquid reducer (urea water, for example) is ejected upstream of a reduction catalyst (not illustrated in the drawings) provided in the exhaust pipe 9 to reduce NOx in the exhaust gas and promote the reduction reaction by the reduction catalyst to detoxify NOx.

Thus, a liquid reducer tank 20 (hereinafter, referred to as a "urea water tank") for storing urea water is provided in the construction machine including this kind of exhaust gas processing device 10. The urea water tank 20 is provided at the rotating upper body 2 at an opposite side of the cab 3 while interposing the boom 4 therebetween.

Further, a toolbox 21 is provided at a front side (an extending direction side of the boom 4, a direction indicated by an arrow X1 in the drawing) of the urea water tank 20, and a fuel tank 19 is provided at a back side (a direction indicated by an arrow X2) of the urea water tank 20.

Figure 3:
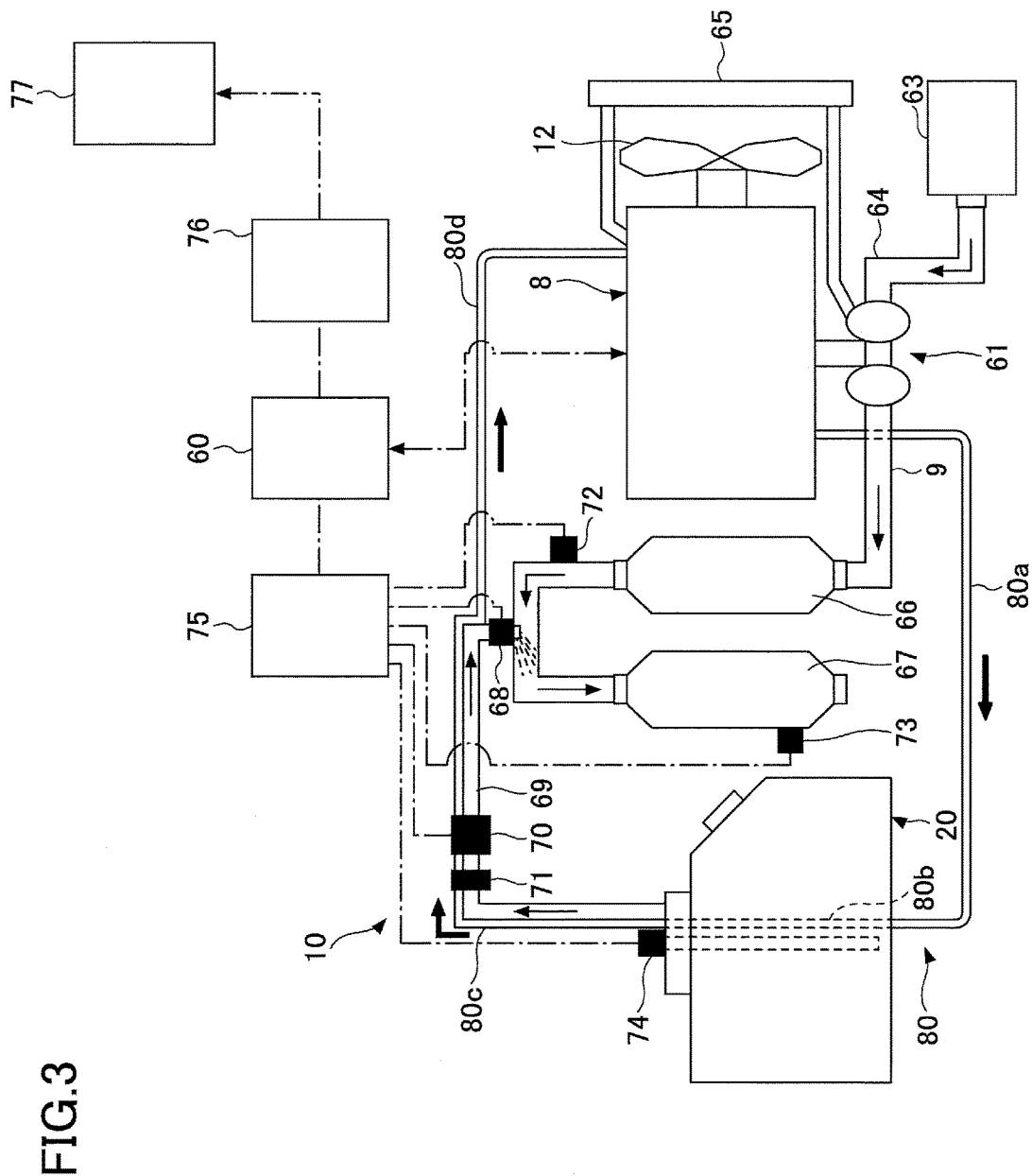
FIG. 3 is a view illustrating an example of a structure of an exhaust gas processing device mounted on the hydraulic shovel of FIG. 1.

FIG. 3 is a schematic view illustrating an example of a structure of the exhaust gas processing device 10. In this embodiment, the exhaust gas processing device 10 cleans the exhaust gas expelled from the diesel engine 8. The diesel engine 8 is controlled by an engine control module (hereinafter, referred to as "ECM") 60.

The exhaust gas from the diesel engine 8, after passing through a turbocharger 61, reaches the downstream exhaust pipe 9 and is exhausted in air after being cleaned by the exhaust gas processing device 10.

On the other hand, inlet air introduced into an inlet pipe 64 via an air cleaner 63 is supplied to the diesel engine 8 after passing through the turbocharger 61, a charge air cooler (inter cooler) 65 and the like.

A diesel particulate filter 66 that collects particles in the exhaust gas and a selective catalytic reduction catalyst 67 that reduces and removes NOx in the exhaust gas are provided in the exhaust pipe 9 sequentially.

By supplying the liquid reducer, the selective catalytic reduction catalyst 67 continuously reduces and removes NOx in the exhaust gas. In this embodiment, urea water (urea water solution) is used as the liquid reducer because of its easy handling.

A urea water injection valve 68 is provided upstream of the selective catalytic reduction catalyst 67 in the exhaust pipe 9 to supply the urea water to the selective catalytic reduction catalyst 67. The urea water injection valve 68 is connected to the urea water tank (liquid reducer tank) via a urea water supply line 69.

Further, a urea water supply pump 70 is provided at the urea water supply line 69, and a filter 71 is provided between the urea water tank 20 and the urea water supply pump 70. The urea water stored in the urea water tank 20 is supplied to the urea water injection valve 68 by the urea water supply pump 70, and is injected from the urea water injection valve 68 upstream of the selective catalytic reduction catalyst 67 in the exhaust pipe 9.

The urea water injected from the urea water injection valve 68 is supplied to the selective catalytic reduction catalyst 67. The supplied urea water is hydrolyzed in the selective catalytic reduction catalyst 67 to generate ammonia. The ammonia reduces the NOx present in the exhaust gas in the selective catalytic reduction catalyst 67 and with this operation, the exhaust gas is cleaned.

A first NOx sensor 72 is provided at upstream of the urea water injection valve 68. Further, a second NOx sensor 73 is provided downstream of the selective catalytic reduction catalyst 67. Each of the NOx sensors 72 and 73 detects NOx concentration in the exhaust gas at the respective position.

A residual urea water sensor 74 is provided at the urea water tank 20. The residual urea water sensor 74 detects the amount of the urea water remaining in the urea water tank 20.

The above described NOx sensors 72 and 73, the residual urea water sensor 74, the urea water injection valve 68 and the urea water supply pump 70 are connected to an exhaust gas controller 75. The exhaust gas controller 75 controls the injection amount of the urea water such that an appropriate amount of the urea water is injected by the urea water injection valve 68 and the urea water supply pump 70 based on the NOx concentrations detected by the NOx sensors 72 and 73, respectively.

Further, the exhaust gas controller 75 calculates a ratio of the remaining amount of the urea water with respect to a total capacity of the urea water tank 20 based on the remaining amount of the urea water output from the residual urea water sensor 74. In this embodiment, the ratio of the remaining amount of the urea water with respect to the total capacity of the urea water tank 20 is referred to as a "remaining amount ratio of urea water". For example, the remaining amount ratio of urea water 50% means that half of the urea water of the capacity of the urea water tank 20 remains in the urea water tank 20.

The exhaust gas controller 75 is connected to the ECM 60 that controls the diesel engine 8 by a communication means. Further, the ECM 60 is connected to a shovel controller 76 by a communication means.

It is configured that various data of the exhaust gas processing device 10 included in the exhaust gas controller 75 can be shared to the shovel controller 76. Here, each of the ECM 60, the exhaust gas controller 75 and the shovel controller 76 includes a CPU, a RAM, a ROM, an input-output port, a memory device and the like.

Further, a monitor 77 (a display device) is connected to the shovel controller 76. Alerts, a driving condition or the like are displayed on the monitor 77.

Further, the exhaust gas processing device 10 includes an antifreeze mechanism that prevents freezing of the urea water tank 20 and the urea water supply line 69. In this example, the antifreeze mechanism uses engine cooling water of the diesel engine 8 that passes through a pipe 80. Specifically, the engine cooling water that has just cooled the diesel engine 8 reaches a second portion 80b via a first portion 80a, of the pipe 80, while maintaining relatively high temperature. The second portion 80b is a part of the pipe 80 that contacts an outside surface of the urea water tank 20. The engine cooling water supplies heat to the urea water tank 20 and the urea water therein when flowing through the second portion 80b. Thereafter, the engine cooling water supplies heat to the urea water supply line 69 and the urea water therein when flowing through a third portion 80c of the pipe 80 that is provided to extend along the urea water supply line 69. Thereafter, the engine cooling water whose temperature becomes relatively low after supplying heat reaches the heat exchanger unit 13 (see FIG. 2) after passing through a fourth portion 80d of the pipe 80. As such, the antifreeze mechanism prevents freezing of the urea water tank 20 and the urea water supply line 69 by supplying heat to the urea water tank 20 and the urea water supply line 69 using the engine cooling water.

Here, in the construction machine, there is a case that an operator gets on a housing cover 2a of the rotating upper body 2 (see FIG. 1) for maintenance or the like. Thus, a stair system 30 (see FIG. 2) is provided at the rotating upper body 2 for the operator to get on the housing cover 2a.

Figure 4:
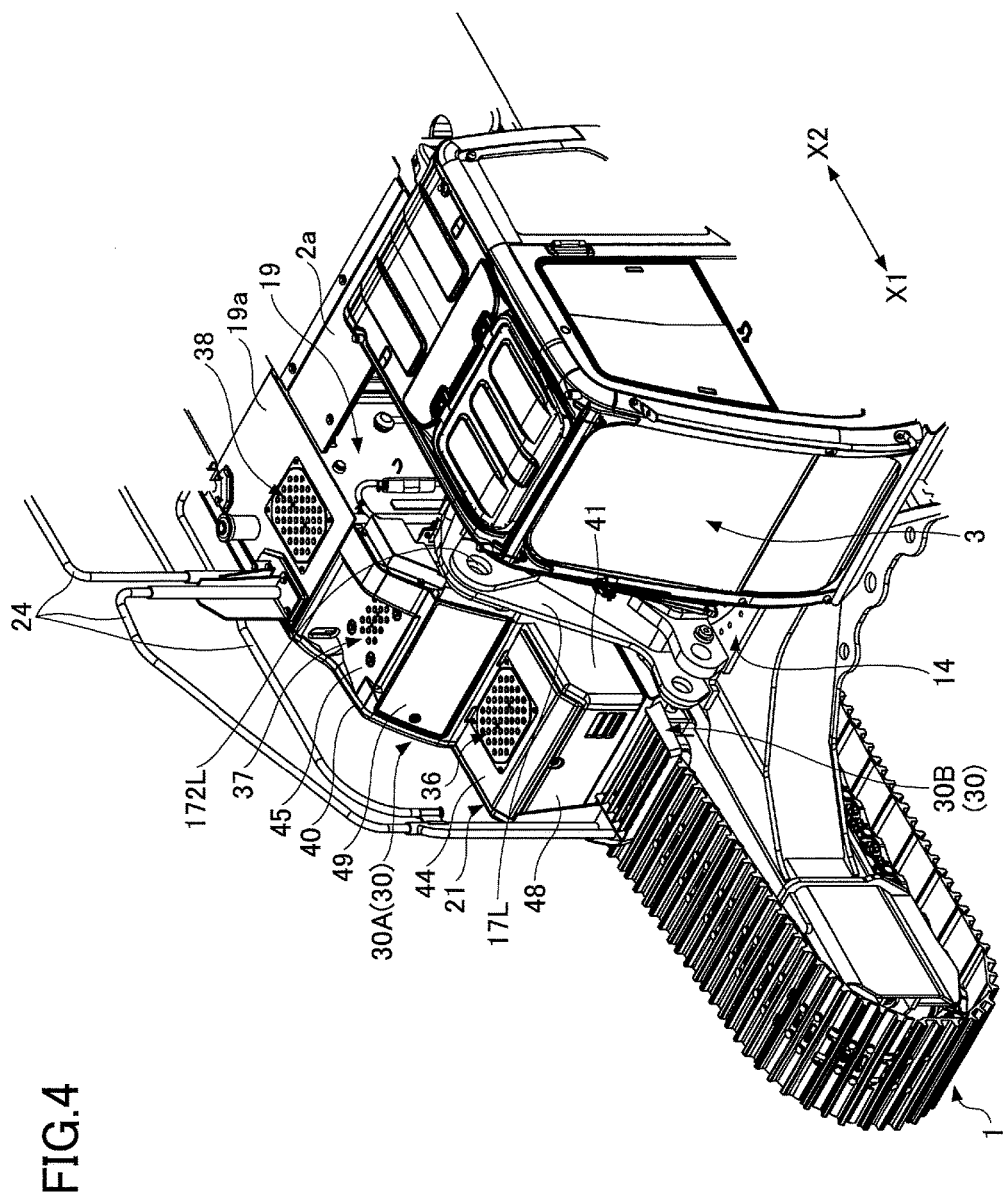
FIG. 4 is an enlarged perspective view illustrating a position near a stair system of the hydraulic shovel of FIG. 1.
Figure 5:
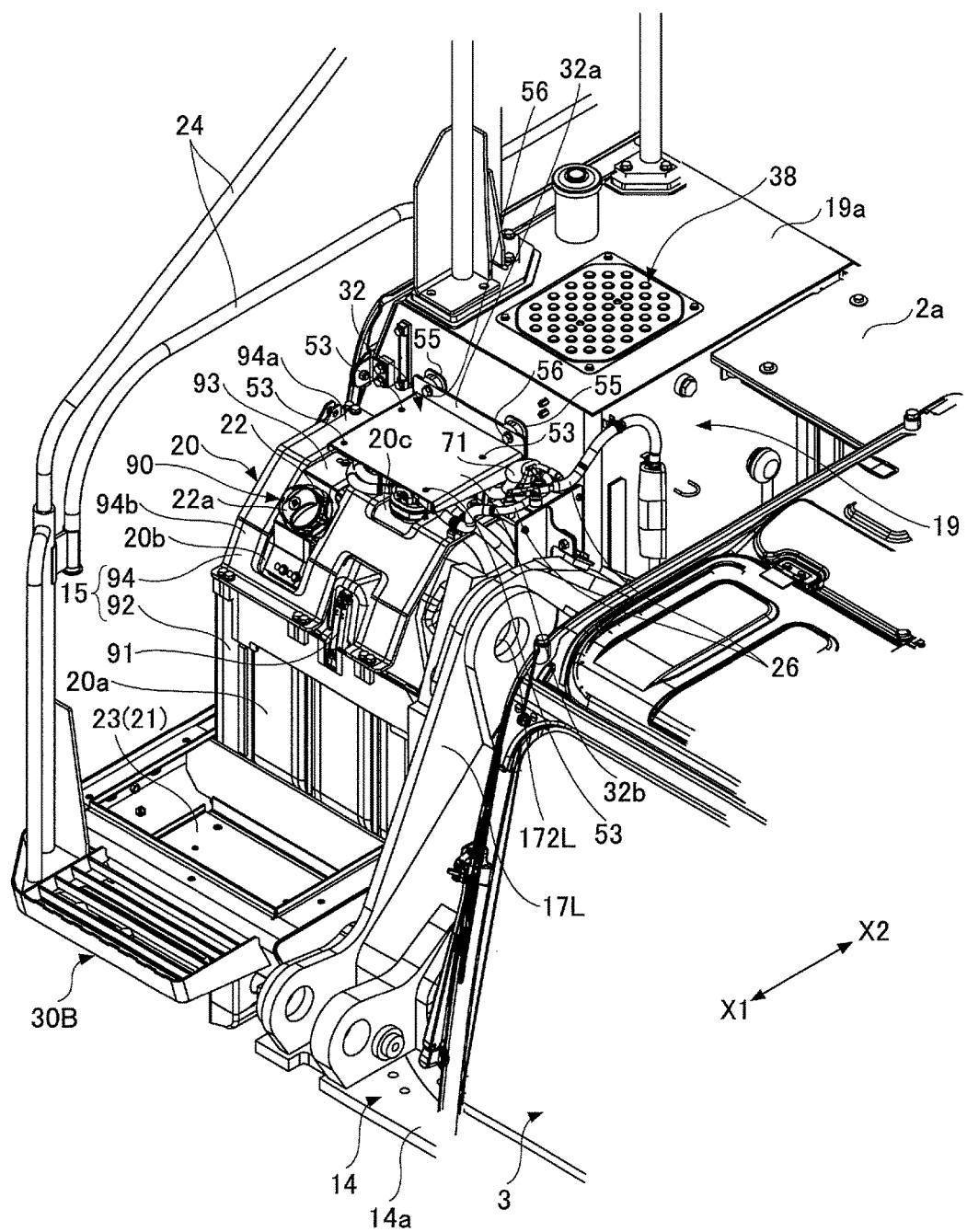
FIG. 5 is a perspective view illustrating the stair system when detached.
Figure 6:
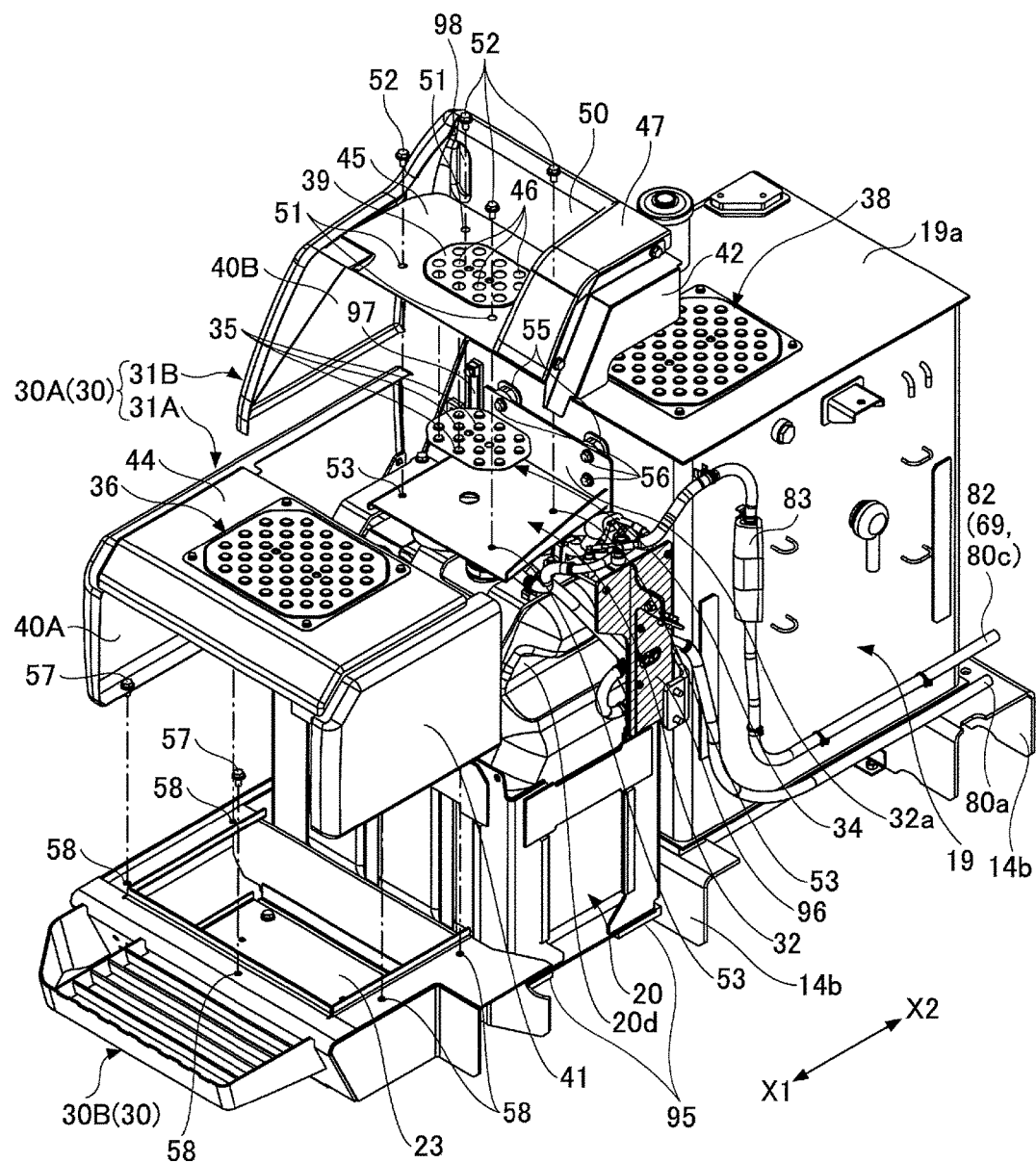
FIG. 6 is an exploded perspective view illustrating a position near the stair system.
Figure 7:
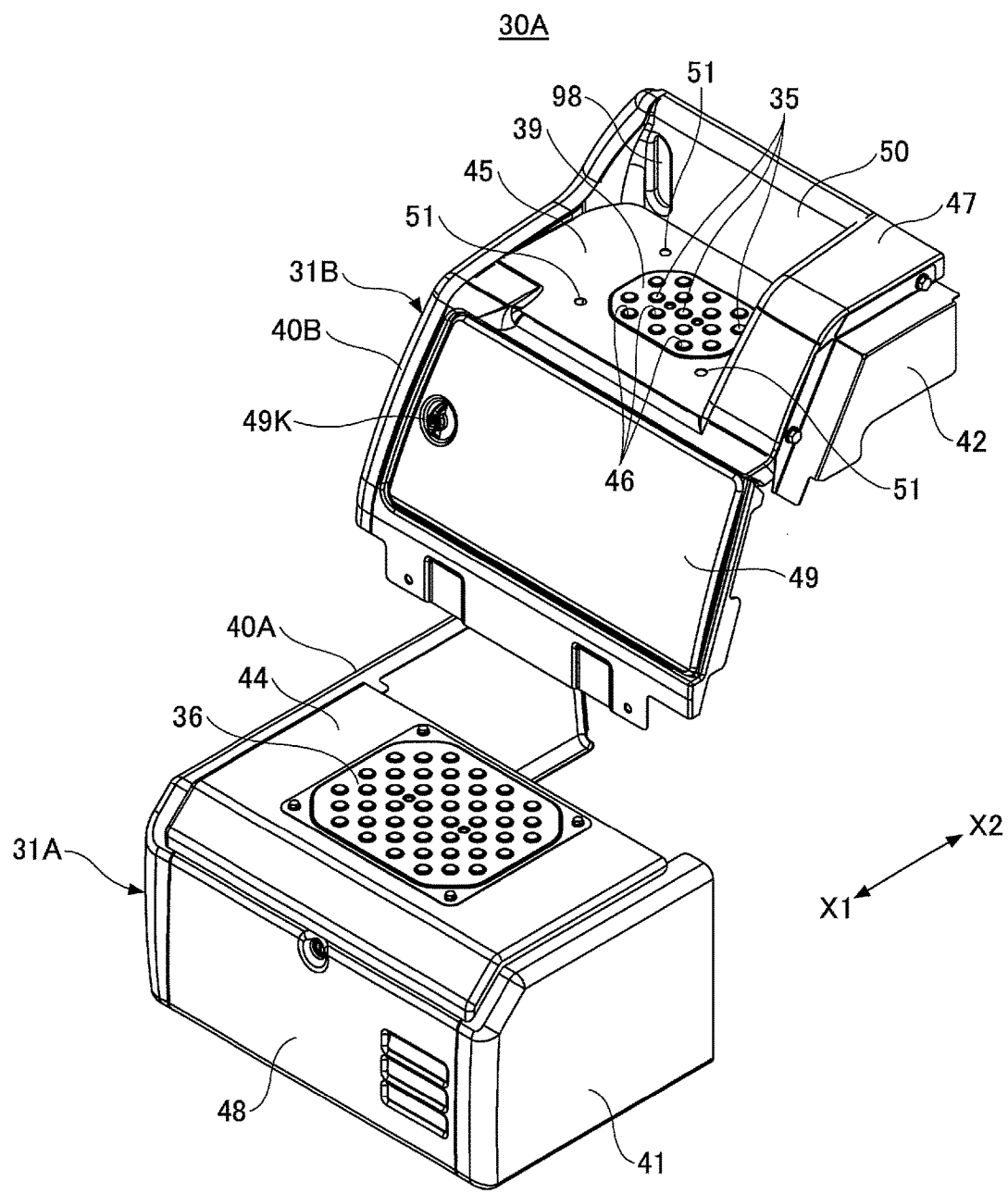
FIG. 7 is a perspective view of a first stair portion.

FIG. 4 to FIG. 6 are enlarged perspective views illustrating a position near the stair system 30, and FIG. 7 is a perspective view of a first stair portion 30A that composes the stair system 30.

As illustrated in FIG. 4 and FIG. 5, a pair of right and left support brackets 17L and 17R for attaching the boom is provided to stand at a front side of a rotating frame 14 of the rotating upper body 2. Boom foot pins (not illustrated in the drawings) that bear the boom 4 are capable of being inserted in holes 172L and 172R formed in the support brackets 17L and 17R, respectively. Further, the fuel tank 19, the urea water tank 20, the toolbox 21, the stair system 30 and the like are provided at a side portion of the support bracket 17L.

Here, handrails 24 for the operator to grip when stepping up and down the stair system 30 are provided at outside of a position of the rotating upper body 2 at which the stair system 30 is provided.

The fuel tank 19 is a tank in which fuel of the diesel engine 8 is stored, and is rigidly fixed to the rotating frame 14. It is desirable for the rotating upper body 2 to be small and high density. Thus, space for the fuel tank 19 is limited. However, as will be described later, it is necessary to provide the urea water tank 20 as well. Thus, in the construction machine of the embodiment, the volume of the fuel tank 19 is retained by setting the height of the fuel tank 19 high.

As illustrated in FIG. 5, the urea water tank 20 in which the urea water is stored is provided near the fuel tank 19 at its front side. A liquid inlet 22 for supplying urea water is provided at a upper front position of the urea water tank 20. A cap 22a is attached to the liquid inlet 22.

Further, as illustrated in FIG. 6, the urea water supply line 69 and the first portion 80a and the third portion 80c of the pipe 80 that function as the antifreeze mechanism are provided at a side position of the fuel tank 19. The urea water supply line 69 and the third portion 80c of the pipe 80 extend along with each other to configure a composite pipe 82. Further, each of the urea water supply line 69 and the pipe 80 is configured by connecting a plurality of pipe portions, and two continuous pipe portions of the composite pipe 82 are connected by a joint portion 83 with a heat insulator.

The urea water tank 20 is a container made of resin and urea water is stored therein. Further, as illustrated in FIG. 3, the urea water tank 20 is connected to the exhaust pipe 9 via the urea water supply line 69, the urea water injection valve 68 and the like. Then, the urea water in the urea water tank 20 is injected in the exhaust pipe 9 from the urea water injection valve 68 via the urea water supply line 69.

As illustrated in FIG. 5, the urea water tank 20 includes a tank body 20a whose horizontal cross section of is a substantially rectangular shape and has a substantially box shape overall. An inclined surface 20b is provided at a upper front side of the tank body 20a. The inclined surface 20b is inclined such that it lays a backward side as it goes upward. Further, an upper surface 20c is provided at a upper side of the tank body 20a.

Further, the liquid inlet 22 is provided at the inclined surface 20b. A filler 90 is detachably attached to the liquid inlet 22. The urea water is supplied from the liquid inlet 22 into the tank body 20a via the filler 90 when refilling the urea water.

Further, a level gauge 91 is provided at the inclined surface 20b. The level gauge 91 displays level (liquid level height) of the urea water in the tank body 20a. The operator supplies the urea water by checking (seeing) the level gauge 91 when refilling the urea water. With this configuration, overflow of the urea water by the operator can be prevented.

Further, a concave portion 20d (see FIG. 6) is formed at a right side portion of the inclined surface 20b. The concave portion 20d functions as a gripping portion (a handle) when attaching and detaching the urea water tank 20 to the tank reinforcing member 92.

Further, a drain plug (not illustrated in the drawings) is provided at a bottom portion of the urea water tank 20. The drain plug is detached when draining the urea water remaining in the urea water tank 20.

The filler 90 is attached to the urea water tank 20 by using a filler bracket 93. The filler bracket 93 is a plate member and is made of metal or other materials (resin or the like, for example). The filler bracket 93 is fixed to the urea water tank 20 by a fastening member such as a bolt or the like. As such, the filler 90 is also attached to the urea water tank 20.

The urea water is supplied when the filler 90 is attached to the urea water tank 20. When supplying the urea water, the cap 22a is detached from the filler 90, and the urea water is injected from an outside end portion of the filler 90. With this operation, the urea water is supplied in the urea water tank 20.

The urea water tank 20, made of resin, configured as the above-described structure, is received in a tank receiving container 15. The tank receiving container 15 includes a tank reinforcing member 92 and a tank bracket 94.

The tank reinforcing member 92 is made of a metal material such as iron or the like, or alternatively, other materials (a material whose strength is higher than that of the urea water tank 20). Further, the tank reinforcing member 92 is placed on a tank mounting plate (see FIG. 6).

The tank bracket 94 is attached to a upper portion of the urea water tank 20 that is mounted on the tank reinforcing member 92. In this embodiment, the tank bracket 94 is fixed to the tank reinforcing member 92 using a bolt. As such, the urea water tank 20 is housed in the tank receiving container 15 under a status that the tank bracket 94 is fixed to the tank reinforcing member 92.

Further, the tank bracket 94 includes an upper surface 94a that extends in a horizontal direction and an inclined surface 94b that extends along the inclined surface 20b of the urea water tank 20. The inclined surface 94b retains the urea water tank 20 by holding the inclined surface 20b of the urea water tank 20 from an upper side under a status that the urea water tank 20 is housed in the tank receiving container 15.

Thus, the urea water tank 20 is retained by the tank bracket 94 to be housed in the tank reinforcing member 92 without being fixed to the tank reinforcing member 92 by using a bolt or the like. With this configuration, the urea water tank 20 is securely retained and reinforced by the tank receiving container 15 (the tank reinforcing member 92 and the tank bracket 94).

Further, the inclined surface 94b of the tank bracket 94 is provided with an opening at a portion corresponding to the level gauge 91. This is for exposing the level gauge 91.

Tools or the like necessary for the maintenance, for example, are housed in the toolbox 21. The toolbox 21 is configured by a storage portion 23 formed in the rotating frame 14 and a stair system 30 (see FIG. 6).

The stair system 30 includes a first stair portion 30A and a second stair portion 30B. The second stair portion 30B is positioned at the lowest step of the stair system 30. The second stair portion 30B is made of metal and is fixed to the rotating frame 14. Further, the second stair portion 30B protrudes in a front direction (X1 direction) from a front end portion of the rotating frame 14.

The first stair portion 30A serves as a cover to cover a upper portion of the urea water tank 20 and a part of the toolbox 21 in addition to serving as a step for the operator to step up and down. Further, as will be explained later, the first stair portion 30A is fixed to the rotating frame 14, the fuel tank 19 and the like.

Here, the fuel tank 19 of the embodiment is configured to have a high height in order to ensure the volume. Thus, the height of the fuel tank 19 is higher for about 100 mm to 200 mm, for example, than that of a conventional one.

Thus, in order to improve the accessibility (easiness to step up and down) of the operator, it is necessary to provide more tread board portions in the stair system 30 compared with a conventional one. The stair system 30 of the embodiment is configured to include two tread board portions 44 and 45 in the first stair portion 30A, and include three tread board portions in total including the second stair portion 30B. With this configuration, the accessibility (easiness to step up and down) by the operator can be improved. Here, the number of the tread board portions provided in the first stair portion 30A is not limited to two steps in particular.

As illustrated in an enlarged manner in FIG. 7, the first stair portion 30A is configured by a combination of a lower step 31A and a upper step 31B. The lower step 31A has a structure in which a lower tread board portion 44 and a lower riser board portion 48 are provided between an outside plate portion 40A and an inside plate portion 41. The upper step 31B has a structure in which a upper tread board portion 45, a middle riser board portion 49 and a upper riser board portion 50 are provided between an outside plate portion 40B and an inside plate portion 42. Each of the tread board portions 44 and 45 is provided to substantially horizontally extend, and further, each of the riser board portions 48 and 50 is provided to substantially vertically extend with respect to each of the tread board portions 44 and 45. Further, the riser board portion 49 is provided to inclined in the X1 direction within a range of 15° to 25° with respect to a normal line to the tread board portion 45.

The lower riser board portion 48 is provided at a lower portion of the lower tread board portion 44. The lower riser board portion 48 and the above described storage portion 23, the outside plate portion 40A, the inside plate portion 41 and the lower tread board portion 44 form a space portion when the first stair portion 30A is fixed to the rotating frame 14 and the fuel tank 19. Thus space portion functions as the toolbox 21.

Further, the lower riser board portion 48 is fixed to the outside plate portion 40A and the inside plate portion 41. Further, the lower tread board portion 44 is configured to be capable of being opened and closed with respect to the outside plate portion 40A, the inside plate portion 41 and the lower riser board portion 48. Thus, by opening the lower tread board portion 44, tools or the like can be placed in and taken from the toolbox 21.

The middle riser board portion 49 is provided between the lower tread board portion 44 and the upper tread board portion 45. The middle riser board portion 49 is configured as a door that is capable of being opened and closed with respect to the outside plate portion 40B, the inside plate portion 42 and the upper tread board portion 45. In this embodiment, the door is configured to open in a lateral direction.

The middle riser board portion 49 is provided at a position facing the liquid inlet 22 of the urea water tank 20. Thus, the liquid inlet 22 of the urea water tank 20 is exposed to the outside when opening the middle riser board portion 49. Here, in this embodiment, by opening the middle riser board portion 49, the level gauge 91 is exposed to the outside as well. Thus, when refilling the urea water, by opening the middle riser board portion 49, the operator can supply the urea water in the urea water tank 20 under a status that the first stair portion 30A is fixed to the rotating upper body 2. The middle riser board portion 49, which functions as a door, is lockable and unlockable by using a release 49K. This prevents the unauthorized access to the liquid inlet 22 of the urea water tank 20. Further, the cap 22a of the liquid inlet 22 may be lockable.

The upper tread board portion 45 is provided with a concave portion 39 (which will be explained later) that forms a second non-slip member 37 (see FIG. 4), a plurality of through-holes 46, and bolt holes 51. Further, the upper riser board portion 50 is integrally formed at a upper portion of the upper tread board portion 45. Further, a cover portion 47 is provided at an inner side position of the upper tread board portion 45 and the upper riser board portion 50 as a protruding portion that protrudes upward from a surface of the upper tread board portion 45. Further, a gauge hole 98 is provided at an outside position of the upper riser board portion 50 for exposing a level gauge 97 (see FIG. 6). The level gauge 97 is provided at an external wall of the fuel tank 19 and displays the level (liquid level height) of the fuel in the fuel tank 19. The operator supplies the fuel while checking (seeing) the level gauge 97 through the gauge hole 98 when refilling the fuel. Thus, overflow of the fuel by the operator can be prevented.

An upper end portion of the upper riser board portion 50 is configured to be flush with the top plate portion 19a (see FIG. 4) of the fuel tank 19 under a status that the first stair portion 30A is fixed. Thus, the operator can step up and down from the housing cover 2a using the stair system 30 (the first and second stair portions 30A and 30B).

Here, the pedal reserve of the tread board portions 44 and 45 is greater than or equal to 240 mm, and is 330 mm in this embodiment. Further, the height of the riser board portion 48, in other words, a distance between the second stair portion 30B and the tread board portion 44 is greater than or equal to 300 mm and less than or equal to 600 mm, and is 400 mm in this embodiment. Further, the height of the riser board portion 49, in other words, a distance between the tread board portion 44 and the tread board portion 45 is greater than or equal to 300 mm and less than or equal to 600 mm, and is 400 mm in this embodiment. This is facilitates the opening and closing of the riser board portion 49 that functions as a door, and also for setting the height of the urea water tank 20 that is housed below the stair system 30 as high as possible. Further, the height of the riser board portion 50, in other words, a distance between the tread board portion 45 and the top plate portion 19a of the fuel tank 19 is greater than or equal to 180 mm and less than or equal to 250 mm, and is 210 mm in this embodiment. This is to avoid reducing the accessibility (easiness to step up and down) by the operator by setting the difference in height excessively larger from the height of the riser board portion 49.

Further, first to third non-slip members 36, 37 and 38 are provided at the tread board portions 44 and 45 and the top plate portion 19a, respectively, in order to prevent slipping of the operator when the operator steps up and down the stair system 30. The first non-slip member 36 is provided at the lower tread board portion 44 and the third non-slip member 38 is provided at the top plate portion 19a.

Each of the first and third non-slip members 36 and 38 has a structure in which a plate member made of rubber provided with a plurality of convex portions for the non-slip member is covered by a metal plate provided with a plurality of through holes from which the plurality of convex portions are protruded from, respectively, and the metal plate is screwed to each of the lower tread board portion 44 and the top plate portion 19a, respectively. The second non-slip member 37 is described later in detail.

The first stair portion 30A having the above-described structure is fixed to the fuel tank 19 or the like by using a step fixing member 32 (see FIG. 5) and the like. The step fixing member 32 is formed by metal, resin with high hardness or the like, for example.

As illustrated in FIG. 5 and FIG. 6, the step fixing member 32 includes a portion to be fixed 32a and an extending plate portion 32b that extends in a front direction (arrow X1 direction) from the portion to be fixed 32a. The fuel tank 19 is provided with fixing sites 55 at a side surface in the front direction side.

The portion to be fixed 32a is fixed to the fixing sites 55 using fixing bolts 56. With this configuration, the step fixing member 32 is fixed to the fuel tank 19. Further, under a status that the step fixing member 32 is fixed to the fuel tank 19, the extending plate portion 32b is extended above the urea water tank 20.

A non-slip member component 34, which is fitted in a concave portion 39 of the upper tread board portion 45 at its back surface, is placed on an upper surface of the extending plate portion 32b. The non-slip member component 34 configures a part of the second non-slip member 37 and is formed by a synthetic rubber or the like having water resistance and oil resistance properties, for example. The non-slip member component 34 is configured such that a plurality of convex portions 35 are integrally formed on a upper surface of a sheet base portion.

The convex portions 35 formed at the non-slip member component 34 are formed at positions corresponding to through-holes 46 formed at the upper tread board portion 45. Each of the convex portions 35 has a cylindrical shape, and the diameter of each of the convex portions 35 is set such that the convex portion 35 can be inserted in the respective through-hole 46. Further, the height of each of the convex portions 35 is set such that a part of its front end protrudes from a upper surface of the upper tread board portion 45 when the convex portions 35 are inserted in the through-holes 46, respectively.

The concave portion 39 to which the non-slip member component 34 is fitted is formed at the back surface of the upper tread board portion 45, and when the non-slip member component 34 is fitted in the concave portion 39, each of the convex portions 35 is aligned under a status that each of the convex portions 35 is inserted in the respective through-hole 46.

As illustrated in FIG. 6, in order to fix the stair system 30 to the rotating frame 14 and the fuel tank 19, the first stair portion 30A (the lower step 31A, the upper step 31B) is aligned above the rotating frame 14. Here, the lower riser board portion 48 and the middle riser board portion 49 are not illustrated in FIG. 6.

When aligned as described above, the lower tread board portion 44 is positioned above the storage portion 23, and the upper tread board portion 45 and the non-slip member component 34 are positioned above the step fixing member 32.

Then, the first stair portion 30A is lowered so that lower end portions of the outside plate portion 40A and the inside plate portion 41 contact a upper surface of the rotating frame 14, and the upper tread board portion 45 contacts the step fixing member 32. At this time, the back surface of the non-slip member component 34 fixed in the concave portion 39 of the upper tread board portion 45 at the back surface contacts the step fixing member 32.

Next, fixing bolts 57 are screwed to screw holes 58, respectively, and fix the outside plate portion 40A and the inside plate portion 41 to the rotating frame 14. Further, fixing bolts 52 are inserted in bolt holes 51 formed at the upper tread board portion 45, and screwed to screw holes 53 formed at the step fixing member 32, respectively. With this configuration, the upper tread board portion 45 is fixed to the step fixing member 32. Further, as described above, the step fixing member 32 is fixed to the fuel tank 19. Thus, the upper tread board portion 45 is fixed to the fuel tank 19 via the step fixing member 32.

Accordingly, the first stair portion 30A may be fixed to the rotating frame 14, the fuel tank 19 and the like after previously integrally forming the lower step 31A and the upper step 31B, or alternatively, the lower step 31A and the upper step 31B may be separately fixed to the rotating frame 14, the fuel tank 19 and the like.

As such, the first stair portion 30A is fixed to the rotating frame 14 and the fuel tank 19. Here, in the following, a status in which the first stair portion 30A is fixed to the rotating frame 14 and the fuel tank 19 is referred to as a fixed status as well.

In the fixed status, as described above, the toolbox 21 is formed at the upper portion of the storage portion 23. Further, in the fixed status, as the first stair portion 30A covers the upper portion of the urea water tank 20, the urea water tank 20 can be protected. Further, even when the first stair portion 30A is configured to cover the urea water tank 20, the operator can easily supply the urea water in the urea water tank 20 by opening the middle riser board portion 49.

Here, the height of the urea water tank 20 from a base level surface is set to be greater than or equal to 75% of the height of the tread board portion 45 of the first stair portion 30A placed on the urea water tank 20 from the base level surface. Specifically, the height of the urea water tank 20 from the base level surface is the height from a bottom surface of the rotating frame 14 to a upper surface of the tank body 20a. The height of the tread board portion 45 of the first stair portion 30A from the base level surface is the height from the bottom surface of the rotating frame 14 to a lower surface of the tread board portion 45. Further, desirably, the height of the urea water tank 20 from the base level surface is set to be greater than or equal to 80% of the height of the tread board portion 45 from the base level surface, and more desirably, greater than or equal to 85%. Further, the base level surface may be the tank mounting plate 95.

Further, the urea water tank 20 is mounted on the rotating frame 14 such that its bottom surface is blow a bottom surface of the fuel tank 19. This is to set the height of the urea water tank 20 housed below the stair system 30 as high as possible. Specifically, the rotating frame 14 includes a bottom plate 14a (see FIG. 5) and beam portions 14b (see FIG. 6) provided on the bottom plate 14a. Then, as illustrated in FIG. 6, the fuel tank 19 is mounted such that its bottom surface is positioned above the two beam portions 14b. Further, the urea water tank 20 is mounted on the bottom plate 14a such that its side surface borders on a side surface of the beam portion 14b, with the tank reinforcing member 92 interposed therebetween, and its bottom surface borders on the bottom plate 14a, with the tank reinforcing member 92 and the tank mounting plate 95 interposed therebetween.

Further, as illustrated in FIG. 5, various pipes 26 and filters 71 are provided on the urea water tank 20, and the pipes 26 and the filters 71 protrude from an upper surface of the tank. The cover portion 47 that protrudes upward from a surface of the tread board portion 45 is configured to cover the pipes 26 and the filters 71 in the fixed status. Thus, by providing the cover portion 47, inappropriately stepping on the pipes 26 and the filters 71 by the operator can be avoided when stepping up and down the stair system 30, and as the pipes 26 and the filters 71 are hidden from view, appearance can be improved.

Further, the urea water supply pump 70 (not illustrated in FIG. 6) is attached to a urea water tank 20 side of the bracket 96. Further, the bracket 96 is attached to the support bracket 17L (see FIG. 4).

Further, in this embodiment, as the stair system 30 includes three steps of tread board portions (the second stair portion 30B and the tread board portions 44 and 45), even when the height of the fuel tank 19 becomes high, accessibility (easiness to step up and down) by the operator can be improved. Thus, the safety of the operator to get on the housing cover 2a can be ensured.

Next, the second non-slip member 37 provided at the upper tread board portion 45 is described.

The second non-slip member 37 includes the non-slip member component 34 that is fitted in the concave portion 39 of the upper tread board portion 45 at its back surface, the through-holes 46 formed at the upper tread board portion 45 and the like. At the fixed status, the plurality of convex portions 35 formed at the non-slip member component 34 are inserted in the through-holes 46 formed at the upper tread board portion 45, respectively, and predetermined portions at upper end portions of the convex portions 35 are protruded from a upper surface of the upper tread board portion 45. Further, the fixing bolts 52 are inserted in the bolt holes 51 of the upper tread board portion 45, respectively.

Thus, the second non-slip member 37 has a structure in which the convex portions 35 of the non-slip member component 34 protrude from the upper surface of the upper tread board portion 45, and thus, the rigidity of the convex portion 35 made of rubber can be increased. Further, as a portion of the non-slip member component 34 other than the convex portions 35 is retained while being interposed between the step fixing member 32 and the upper tread board portion 45, durability of the non-slip member component 34 (second non-slip member 37) can be increased.

Further, as the conventional non-slip member has a structure in which the non-slip member component is provided at the upper surface of the tread board portion, there is a possibility that the operator stumbles by the non-slip member component when stepping up and stepping down. However, according to the second non-slip member 37 of the embodiment, as there are no protrusions other than the convex portion 35 at the upper surface of the upper tread board portion 45, it is possible to avoid stumbling the operator. Thus, safety in stepping up and down can be increased.

Further, although it is necessary for the second non-slip member 37 of the embodiment to have a component that supports the non-slip member component 34 at a position facing the lower surface of the upper tread board portion 45, according to the embodiment, by using the step fixing member 32, the non-slip member component 34 is provided to be interposed between the step fixing member 32 and the upper tread board portion 45. Thus, it is unnecessary to provide an additional part for supporting the non-slip member component 34, and the number of the parts can be reduced.

Figure 8:
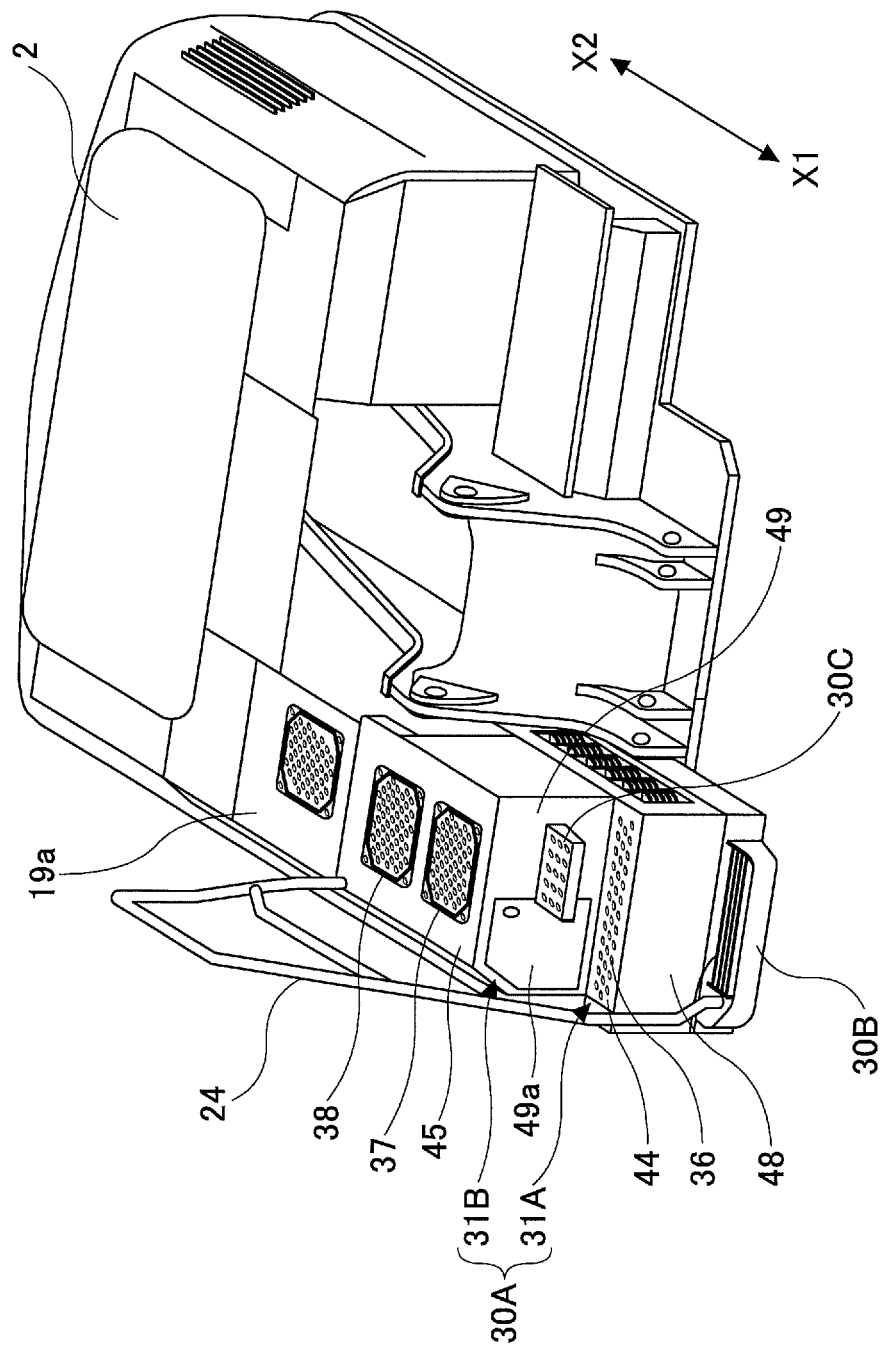
FIG. 8 is a perspective view illustrating another example of a structure of the stair system.
Figure 9:
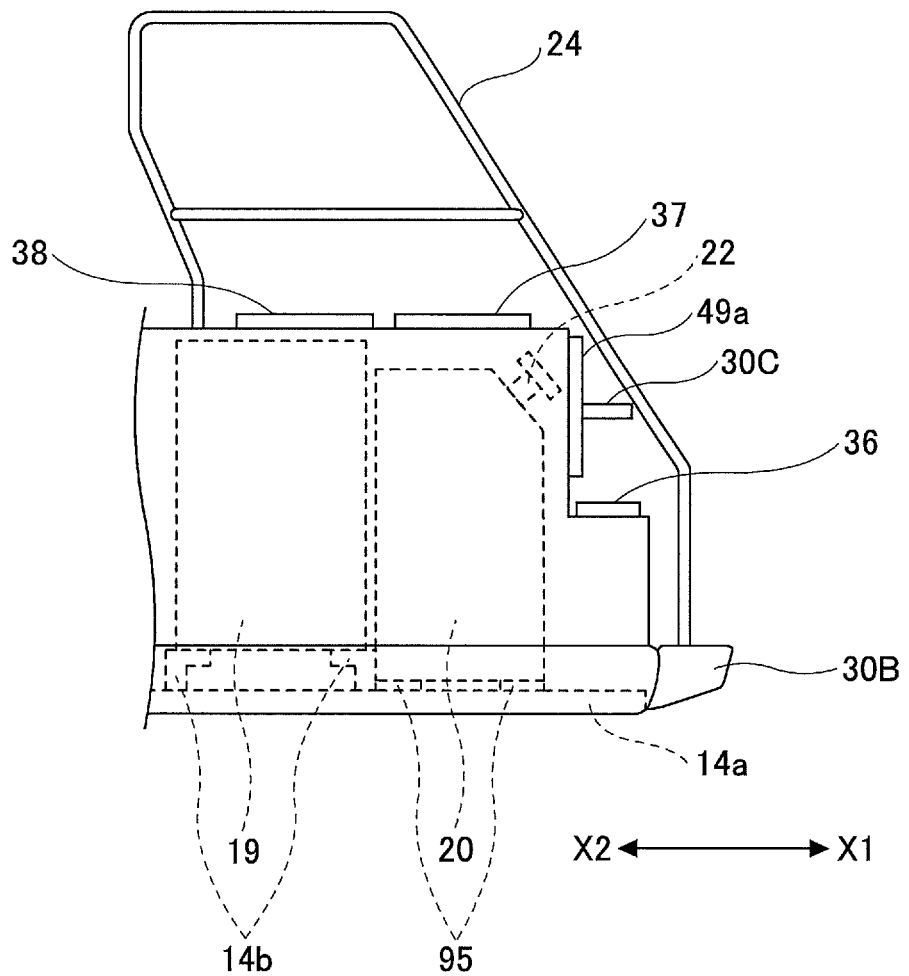
FIG. 9 is a side view illustrating another example of a structure of the stair system.

Next, with reference to FIG. 8 and FIG. 9, another example of a structure of the stair system 30 mounted on the shovel of the embodiment is explained. FIG. 8 is a perspective view of the rotating upper body 2 including the stair system 30 and FIG. 9 is its side view.

The stair system 30 illustrated in FIG. 8 and FIG. 9 differs from the stair system 30 illustrated in FIG. 4 to FIG. 7 in that it includes a third stair portion 30C, the surface of the second non-slip member 37 and the surface of the third non-slip member 38 are provided at the same height as the top plate portion 19a of the fuel tank 19, and it includes a door 49a capable of being opened and closed at a part of the riser board portion 49.

Specifically, in the stair system 30 illustrated in FIG. 8 and FIG. 9, two steps of tread board portions 44 and 45 are provided in the first stair portion 30A, and four tread board portions, including the second stair portion 30B and the third stair portion 30C, are provided.

The first stair portion 30A has a combined structure of the lower step 31A and the upper step 31B. The lower step 31A includes the lower tread board portion 44 and the lower riser board portion 48. Further, the upper step 31B includes the upper tread board portion 45 and the riser board portion 49. Each of the tread board portions 44 and 45 is provided to extend in a substantially horizontal direction, and further, each of the riser board portions 48 and 49 are provided to extend in a substantially vertical direction with respect to each of the tread board portions 44 and 45. The middle riser board portion 49 is provided between the lower tread board portion 44 and the upper tread board portion 45, and includes the door 49a capable of being opened and closed. As illustrated in FIG. 9, the door 49a is provided to open in a lateral direction at a position facing the liquid inlet 22 of the urea water tank 20. Thus, the liquid inlet 22 is exposed to the outside when the door 49a is opened. When supplying the urea water, the operator can supply the urea water to the urea water tank 20 when the first stair portion 30A is fixed to the rotating upper body 2 by opening the door 49a. The door 49a is lockable. This prevents unauthorized access to the liquid inlet 22 of the urea water tank 20. As such, the first stair portion 30A functions as steps for the operator to step up and down, and also functions as a cover to cover the upper portion of the urea water tank 20.

The third stair portion 30C is provided between the lower tread board portion 44 and the upper tread board portion 45. Specifically, the third stair portion 30C is made of metal and is positioned vertically with respect to the riser board portion 49 to extend in a substantially horizontal direction. Further, the third stair portion 30C has a structure that protrudes in a front direction (X1 direction) from the riser board portion 49.

Further, as illustrated in FIG. 9, the urea water tank 20 is mounted on the rotating frame 14 such that its bottom surface is positioned lower than the bottom surface of the fuel tank 19. This is for setting the height of the urea water tank 20 that is received under the stair system 30 as high as possible. Specifically, the rotating frame 14 includes the bottom plate 14a and the beam portions 14b provided on the bottom plate 14a. The fuel tank 19 is mounted such that its bottom surface is positioned above the two beam portions 14b. Further, the urea water tank 20 is mounted on the bottom plate 14a such that its side surface borders on a side surface of the while interposing the tank reinforcing member 92 (not illustrated in the drawings) therebetween, and also its bottom surface borders on the bottom plate 14a while interposing the tank reinforcing member 92 and the tank mounting plate 95 therebetween. Here, the tank receiving container 15 that houses the urea water tank 20 is not illustrated in FIG. 9.

With the above structure, the stair system 30 as illustrated in FIG. 8 and FIG. 9 is capable of actualizing the effects same as those of the stair system 30 illustrated in FIG. 4 to FIG. 7.

Although a particular embodiment has been illustrated and described, the present invention is not limited to the specifically disclosed embodiments, and numerous variations and modifications may be made without departing from the spirit and scope of the present invention.

What is claimed is:

1. A shovel comprising:
a boom;
a rotating upper body that supports the boom;
an engine mounted on the rotating upper body;
a cab mounted on the rotating upper body;
a rotating frame mounted on the rotating upper body;
a fuel tank mounted on the rotating frame;
a liquid reducer tank, placed on the rotating frame, that stores liquid reducer; and
a stair system mounted on the rotating frame such that the boom is interposed between the cab and the stair system,
wherein the liquid reducer tank is placed in a space formed under the stair system,
wherein the stair system further provides a space portion that functions as a toolbox,
wherein the space portion that functions as the toolbox and the space in which the liquid reducer tank is placed are in open communication with each other within the stair system,
wherein the stair system includes a riser board that faces a liquid inlet of the liquid reducer tank, the riser board including a first door capable of being opened and closed,
wherein the stair system further includes a second door, separately provided from the first door, for placing a tool in and taking a tool out from the space portion that functions as the toolbox, and
wherein the space portion that functions as the toolbox is positioned in front of the liquid reducer tank.

2. The shovel according to claim 1,
wherein the stair system further includes a plurality of tread boards, and
wherein the height of the liquid reducer tank from a base level surface is greater than or equal to 75% of the height of one of the tread boards of the stair system that is placed at an upper portion of the liquid reducer tank from the base level surface.

3. The shovel according to claim 1,
wherein the liquid reducer tank is housed in a container that functions as a protection mechanism.

4. The shovel according to claim 3,
wherein the container is provided with an opening at a portion of a level gauge of the liquid reducer tank.

5. The shovel according to claim 1,
wherein the first door is lockable.

6. The shovel according to claim 1, further comprising:
a pump for aspirating the liquid reducer provided in the space, and a filter that is attached to the pump.

7. The shovel according to claim 6,
wherein the stair system includes a protrusion, and
wherein the pump is placed in a space formed under the protrusion.

8. The shovel according to claim 1,
wherein the stair system further includes a plurality of tread boards, and
wherein the pedal reserve of the plurality of tread boards is greater than or equal to 240 mm.

9. The shovel according to claim 1,
wherein the liquid reducer tank is connected to an exhaust pipe of the engine via a supply line, and
wherein the supply line extends along a pipe through which engine cooling water flows.

10. The shovel according to claim 1,
wherein a bottom surface of the liquid reducer tank mounted on the rotating frame is lower than a bottom surface of the fuel tank mounted on the rotating frame.

11. The shovel according to claim 1,
wherein the stair system further includes a first tread board that includes the second door, and a second tread board provided at a higher position of the first tread board,
wherein the riser board including the first door is provided between the first tread board and the second tread board, and
wherein the second door is configured to be capable of being opened and closed so that a tool is capable of being placed in and taken from the toolbox.

12. The shovel according to claim 1,
wherein the stair system further includes a first tread board that includes the second door, and a second tread board provided at a higher position of the first tread board,
wherein the riser board including the first door is provided between the first tread board and the second tread board, and
wherein the second door is provided above the space portion that functions as the toolbox and is configured to be capable of being opened and closed.

13. The shovel according to claim 1,
wherein the stair system further includes a plurality of tread boards, and
wherein the second door is provided at one of the tread boards that is positioned at a lower side of the riser board that faces the liquid inlet of the liquid reducer tank and in which the first door is included.

14. The shovel according to claim 1, wherein the space portion that functions as the toolbox is configured to receive a tool to be placed on the rotating frame so that the liquid reducer tank and the tool received in the toolbox are exposed while being placed on the rotating frame when the stair system is removed from the rotating frame.

15. The shovel according to claim 1, wherein the stair system further includes a plurality of tread boards and a plurality of riser boards including the riser board that faces the liquid inlet of the liquid reducer tank.

16. A shovel comprising:
a boom;
a rotating upper body that supports the boom;
an engine mounted on the rotating upper body;
a cab mounted on the rotating upper body;
a rotating frame mounted on the rotating upper body;
a fuel tank mounted on the rotating frame;
a liquid reducer tank, placed on the rotating frame, that stores liquid reducer; and
a stair system mounted on the rotating frame such that the boom is interposed between the cab and the stair system,
wherein the liquid reducer tank is placed in a space formed under the stair system,
wherein the stair system further provides a space portion that functions as a toolbox,
wherein the stair system includes a riser board that faces a liquid inlet of the liquid reducer tank, the riser board including a first door capable of being opened and closed, and
wherein the stair system is configured as a modular cover without a base, whereby removal of the stair system is accomplished without moving the liquid reducer tank and a tool in the space portion.

17. The shovel according to claim 16,
wherein the stair system further includes a plurality of tread boards, and
wherein a second door, separately provided from the first door, for placing a tool in and taking a tool out from the space portion that functions as the toolbox, is provided at one of the tread boards that is positioned at a lower side of the riser board that faces the liquid inlet of the liquid reducer tank and in which the first door is included.

18. The shovel according to claim 17,
wherein the liquid reducer tank is placed on the rotating frame without interposing a part of the stair system between the liquid reducer tank and the rotating frame, and
wherein the space portion that functions as the toolbox is configured to receive the tool without interposing a part of the stair system between the tool and the rotating frame.

* * * * *